(12) United States Patent
Kim et al.

(10) Patent No.: US 11,961,673 B2
(45) Date of Patent: Apr. 16, 2024

(54) MULTILAYER CERAMIC CAPACITOR

(71) Applicant: SAMSUNG ELECTRO-MECHANICS CO., LTD., Suwon-si (KR)

(72) Inventors: Hwi Dae Kim, Suwon-si (KR); Ji Hong Jo, Suwon-si (KR); Woo Chul Shin, Suwon-si (KR); Sang Soo Park, Suwon-si (KR); Chan Yoon, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 18/133,153

(22) Filed: Apr. 11, 2023

(65) Prior Publication Data

US 2023/0245822 A1    Aug. 3, 2023

Related U.S. Application Data

(63) Continuation of application No. 17/675,313, filed on Feb. 18, 2022, now Pat. No. 11,670,451, which is a
(Continued)

(30) Foreign Application Priority Data

Jul. 24, 2019    (KR) .................. 10-2019-0089407

(51) Int. Cl.
*H01G 4/01* (2006.01)
*H01G 4/12* (2006.01)

(52) U.S. Cl.
CPC .............. *H01G 4/01* (2013.01); *H01G 4/1227* (2013.01)

(58) Field of Classification Search
CPC ........ H01G 4/01; H01G 4/012; H01G 4/1227; H01G 4/232; H01G 4/30
See application file for complete search history.

(56) References Cited

U.S. PATENT DOCUMENTS 6,331,930 B1    12/2001    Kuroda et al.
7,298,603 B2    11/2007    Mizuno et al.
(Continued)

FOREIGN PATENT DOCUMENTS

CN    101714455 A    5/2010
CN    103797553 A    5/2014
(Continued)

OTHER PUBLICATIONS

Chinese Office Action dated Sep. 19, 2022, issued in corresponding Chinese Patent Application No. 202010272458.8.
(Continued)

*Primary Examiner* — Nathan Milakovich
(74) *Attorney, Agent, or Firm* — Morgan, Lewis & Bockius LLP (57) ABSTRACT

A multilayer ceramic electronic component includes a ceramic body comprising dielectric layers and first and second internal electrodes laminatedly disposed in a third direction with respective dielectric layers interposed therebetween, and first electrode and second external electrodes disposed on both surfaces of the ceramic body in the first direction and electrically connected to the first and second internal electrodes. When an absolute value of a horizontal angle in the second direction of the first internal electrode with respect to the first surface of the ceramic body is referred to a first angle of the internal electrode, a total sum of the first angles is less than 10°.

12 Claims, 4 Drawing Sheets

Related U.S. Application Data continuation of application No. 16/776,146, filed on Jan. 29, 2020, now Pat. No. 11,348,727.

(56) References Cited

U.S. PATENT DOCUMENTS

| | | |
|---|---|---|
| 10,256,043 B2 | 4/2019 | Kim et al. |
| 10,269,498 B2 | 4/2019 | Kato |
| 10,943,736 B2 | 3/2021 | Lee et al. |
| 2010/0085682 A1 | 4/2010 | Abe et al. |
| 2012/0257322 A1 | 10/2012 | Shiota |
| 2012/0306325 A1 | 12/2012 | Kim |
| 2014/0126106 A1 | 5/2014 | Sawada |
| 2014/0367152 A1 | 12/2014 | Lee et al. |
| 2015/0043127 A1 | 2/2015 | Rinner |
| 2015/0096795 A1 | 4/2015 | Hong et al. |
| 2015/0213955 A1 | 7/2015 | Lee et al. |
| 2016/0233024 A1 | 8/2016 | Kim et al. |
| 2017/0154733 A1 | 6/2017 | Lee et al. |
| 2017/0243695 A1 | 8/2017 | Kim et al. |
| 2018/0301281 A1 | 10/2018 | Park et al. |
| 2019/0096584 A1 | 3/2019 | Hong et al. |
| 2021/0098195 A1 | 4/2021 | Otani et al. |
| 2021/0313114 A1 | 10/2021 | Kim et al. |

FOREIGN PATENT DOCUMENTS

| | | |
|---|---|---|
| CN | 104240950 A | 12/2014 |
| CN | 104517726 A | 4/2015 |
| CN | 104810151 A | 7/2015 |
| CN | 105869886 A | 8/2016 |
| CN | 106816312 A | 6/2017 |
| CN | 108735507 A | 11/2018 |
| CN | 109559889 A | 4/2019 |
| JP | 8-130160 A | 5/1996 |
| JP | H11-54365 A | 2/1999 |
| JP | 2001-155959 A | 6/2001 |
| JP | 2003-133161 A | 5/2003 |
| JP | 2006-005105 A | 1/2006 |
| JP | 2010-092896 A | 4/2010 |
| JP | 2014-112647 A | 6/2014 |
| JP | 2018-46086 A | 3/2018 |
| JP | 2019-009463 A | 1/2019 |
| KR | 10-1499726 B1 | 3/2015 |
| KR | 10-2017-0098560 A | 8/2017 |
| WO | 2011/071145 A1 | 6/2011 |

OTHER PUBLICATIONS

U.S. Notice of Allowance dated Mar. 24, 2023, issued in corresponding U.S. Appl. No. 17/675,313.

Japanese Office Action dated Jul. 11, 2023, issued in corresponding Japanese Patent Application No. 2020-011436.

Office Action issued on Feb. 16, 2024, in the corresponding Korean Patent Application No. 10-2019-0089407.

MULTILAYER CERAMIC CAPACITOR

CROSS-REFERENCE TO RELATED APPLICATION(S)

This application is the continuation application of U.S. patent application Ser. No. 17/675,313 filed on Feb. 18, 2022, which is the continuation application of U.S. patent application Ser. No. 16/776,146 filed Jan. 29, 2020, which claims the benefit of priority to Korean Patent Application No. 10-2019-0089407 filed on Jul. 24, 2019 in the Korean Intellectual Property Office, the disclosure of which is incorporated herein by reference in its entirety.

TECHNICAL FIELD

The present disclosure relates to a multilayer ceramic capacitor, more specifically to a multilayer ceramic capacitor having excellent electric field characteristics.

BACKGROUND

There is a recent trend for multilayer ceramic capacitors to be miniaturized in accordance with the miniaturization, slimming and multi-functionalization of electronic products, and the mounting of multilayer ceramic capacitors is becoming more integrated. Such multilayer ceramic capacitors may be used as components of various electronic devices as they are advantageous in the miniaturized size, secured high capacity and easy mounting thereof.

However, the multilayer ceramic capacitors are easily deformed by external force as internal electrodes and dielectric layers become thinner to obtain high capacity. In particular, when the internal electrodes are bent or deformed, it is highly likely that designed electrical field characteristics may not be implemented.

Accordingly, for commercial application of thin multilayer ceramic capacitors having high capacity, there has been a need to improve structural reliability by providing a structure for multilayer ceramic capacitors which are less likely to be deformed by external force and can secure reliability.

SUMMARY

An aspect of the present disclosure is to provide a multilayer ceramic capacitor, and more specifically, to a multilayer ceramic capacitor having excellent electrical field characteristics and reliability.

According to an aspect of the present disclosure, a multilayer ceramic capacitor includes a ceramic body comprising dielectric layers and first and second internal electrodes laminatedly disposed in a third direction with respective dielectric layers interposed therebetween, and first and second surfaces opposing each other in a direction in which the first and second internal electrodes are laminated, third and fourth surfaces connected to the first and second surfaces and opposing each other in a first direction, and fifth and sixth surfaces connected to the first and second surfaces and the third and fourth surfaces and opposing each other in a second direction; and first electrode and second external electrodes disposed on both surfaces of the ceramic body in the first direction, where the first and second external electrodes are connected to the first and second internal electrodes. When an absolute value of a horizontal angle in the second direction of the first internal electrode with respect to the first surface of the ceramic body is referred to a first angle of the internal electrode, a total sum of the first angles is less than 10°.

According to another aspect of the present disclosure, a multilayer ceramic capacitor includes a ceramic body comprising dielectric layers and first and second internal electrodes laminatedly disposed in a third direction with respective dielectric layers interposed therebetween, and first and second surfaces opposing each other in a direction in which the first and second internal electrodes are laminated, third and fourth surfaces connected to the first and second surfaces and opposing each other in a first direction, and fifth and sixth surfaces connected to the first and second surfaces and the third and fourth surfaces and opposing each other in a second direction; and first electrode and second external electrodes disposed on both surfaces of the ceramic body in the first direction, where the first and second external electrodes are connected to the first and second internal electrodes. When an absolute value of a horizontal angle in the second direction of the second internal electrode with respect to the first surface of the ceramic body is referred to a second angle of the internal electrode, a total sum of the first angles is less than 10°.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

The invention may be embodied in many different forms and should not be construed as being limited to the embodiments set forth herein. Rather, these embodiments are provided so that this disclosure will be thorough and complete, and will fully convey the scope of the invention to those skilled in the art. Accordingly, the shapes and dimensions of elements in the drawings may be exaggerated for clarity, and the same reference numerals will be used throughout to designate the same or like elements. In the specification, unless otherwise specifically indicated, when a certain part "includes" a certain component, it is understood that other components may be further included but are not excluded.

In the drawings, anything unnecessary for describing the present disclosure will be omitted for clarity, and thicknesses are enlarged for the purpose of clearly illustrating layers and areas. Like reference numerals in the drawings denote like elements.

Hereinafter, preferred embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present disclosure will be described with reference to schematic views illustrating embodiments of the present disclosure. In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape results in manufacturing. The following embodiments may also be constituted by one or a combination thereof.

The contents of the present disclosure described below may have a variety of configurations and propose only a required configuration herein, but are not limited thereto.

Referring to FIGS. 1 to 4, a multilayer ceramic capacitor 100 according to an exemplary embodiment may include a ceramic body 110 including dielectric layers 111 and first and second internal electrodes 121 and 122 laminatedly disposed in a third direction with respective dielectric layers 111 interposed therebetween, and first and second surfaces S1 and S2 opposing each other in a direction in which the first and second internal electrodes 121 and 122 are laminated, third and fourth surfaces S3 and S4 connected to the first and second surfaces S1 and S2 and opposing each other in a first direction, and fifth and sixth surfaces S5 and S6 connected to the first and second surfaces S1 and S2 and the third and fourth surfaces S3 and S4 and opposing each other in a second direction, and first electrode and second external electrodes 131 and 132 disposed on both surfaces of the ceramic body 110 in the first direction, where the first and second external electrodes 131 and 132 are connected to the first and second internal electrodes 121 and 122.

When an absolute value of a horizontal angle in the second direction of the first internal electrode 121 with respect to the first surface of the ceramic body is referred to as a first angle of the internal electrode, a total sum of the first angles may be less than 10°.

With regard to the multilayer ceramic capacitor according to an exemplary embodiment, the "length direction" is defined as an "X" direction or a "first direction", the "width direction" is defined as a "Y direction" or a "second direction" while the "thickness direction" is defined as a "Z" direction or a "third" direction. The "thickness direction" may be used in the same sense as a direction in which the dielectric layers are laminated, that is, a "lamination direction."

In an exemplary embodiment, the ceramic body 110 is not particularly limited in terms of configuration, but may be a rectangular cuboid shape as illustrated in the drawings.

The ceramic body 110 may include a first surface S1 and a second surface S2 opposing each other in a third or thickness direction, a third surface S3 and a fourth surface S4 connected to the first surface S1 and the second surface S2 and opposing each other in a first or length direction, and a fifth surface S5 and a sixth surface S6 connected to the first to fourth surfaces and opposing each other in a second or width direction. In this context, the capacitor may be mounted at one of the first and second surfaces S1 and S2. Thus, one of the first and second surfaces S1 and S2 may be referred to as a mounting surface. The third and fourth surfaces S3 and S4 may be referred to as end surfaces and the fifth and sixth surfaces S5 and S6 may be referred to as side surfaces.

One edge of each of the plurality of the first and second internal electrodes 121 and 122, which are formed in the ceramic body 110, are exposed respectively to the third surface S3 and the fourth surface S4 of the ceramic body. The internal electrodes 121 and 122 may include the first internal electrode 121 and the second internal electrode 122 having different polarities in pairs. Thus, one edge of the first internal electrode 121 is exposed to the third surface S3, while one edge of the second internal electrode 122 is exposed to the fourth surface S4.

First and second external electrodes 131 and 132 formed respectively on the third surface S3 and the fourth surface S4 of the ceramic body are connected to the internal electrodes.

According to an exemplary embodiment, a raw material forming the dielectric layers 111 is not particularly limited as long as sufficient capacitance can be obtained therefrom; for example, a barium titanate material, a lead composite perovskite material, a strontium titanate material, or the like, can be used.

As for a material forming the dielectric layers 111, various ceramic additives, organic solvents, plasticizers, binders, dispersants, or the like, can be added to a powder of barium titanate, or the like, according to a purpose of the present disclosure.

For example, a transition metal oxide or a transition metal carbide, a rare-earth element, magnesium (Mg), aluminum (Al), or the like, may be used for the ceramic additive.

In an example of the present disclosure, a margin portion may be disposed on both sides (the fifth surface and the sixth surface) of the ceramic body in the second direction (Y direction), which is perpendicular to the first and third directions.

Conventionally, a surface of the dielectric layer was formed to be larger than that of an internal electrode in order to form margin portions on remaining circumferential portions of the internal electrodes, which excludes portions connected to external electrodes. In this case, however, when dozens to hundreds of dielectric layers are laminated, the dielectric layers elongate to fill a space adjacent to a step portion, and the internal electrodes bend. When the internal electrodes bend, breakdown voltage (BDV) is reduced in the bent portion.

Accordingly, the multilayer ceramic capacitor according to an exemplary embodiment prevents the space adjacent to the step portion from occurring by removing the margin portions on both surfaces of the internal electrodes in the second direction so that the internal electrodes can have an angle which is described below. Further, reliability of the multilayer ceramic capacitor can be improved by preventing the internal electrodes from bending and the BDV from thus decreasing.

Along therewith, the internal electrodes can be protected by disposing the margin portions on both surfaces of the ceramic body in the second direction. Further, as the margin portions are separately formed, there is no need to consider manufacturing errors such as misalignment of the internal electrodes, or the like. Accordingly, capacity per unit volume can be increased as a thickness (Wm) of the margin portions can be smaller than a thickness of conventional margin portions.

Accordingly, when the body 100 includes the margin portions, the margin portions may be disposed on both surfaces (the fifth and sixth surfaces) in the second directions by which the first and second internal electrodes are exposed.

The margin portions may be formed of an insulating material, and may be formed of a ceramic material such as barium titanate, or the like. In this case, the margin portions may include the same ceramic material as the dielectric layer 111 or may be formed of the same material as the dielectric layer 111.

A method for forming the margin portions is not particularly limited, but may involve applying slurry containing ceramic or laminating a dielectric sheet on both surfaces of the ceramic body in the second direction.

The multilayer ceramic capacitor according to the present disclosure may include a plurality of the internal electrodes 121 and 122 alternately disposed with respective dielectric layers 111 disposed therebetween. The first and second internal electrodes 121 and 122 may be electrically separated by the dielectric layers 111 disposed therebetween.

Figure 1:
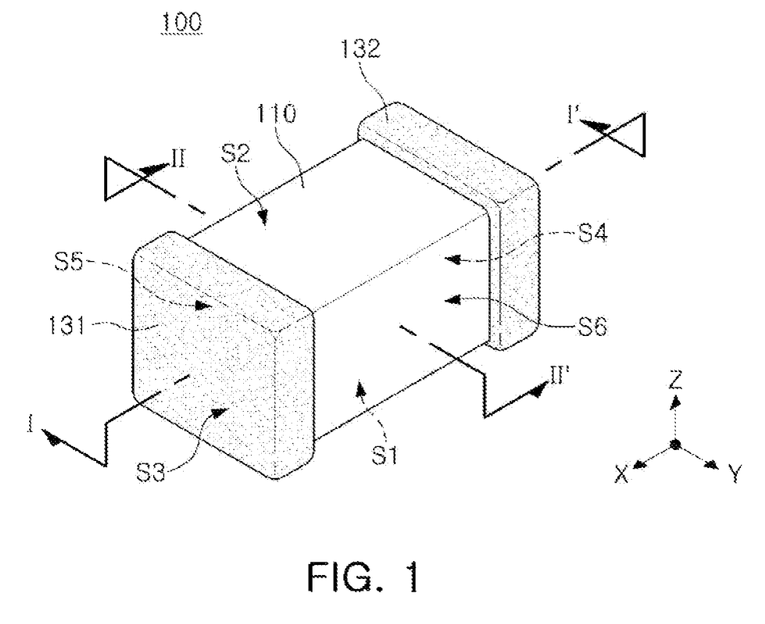
FIG. 1 is a schematic perspective view of a multilayer ceramic capacitor according to an exemplary embodiment in the present disclosure.
Figure 2:
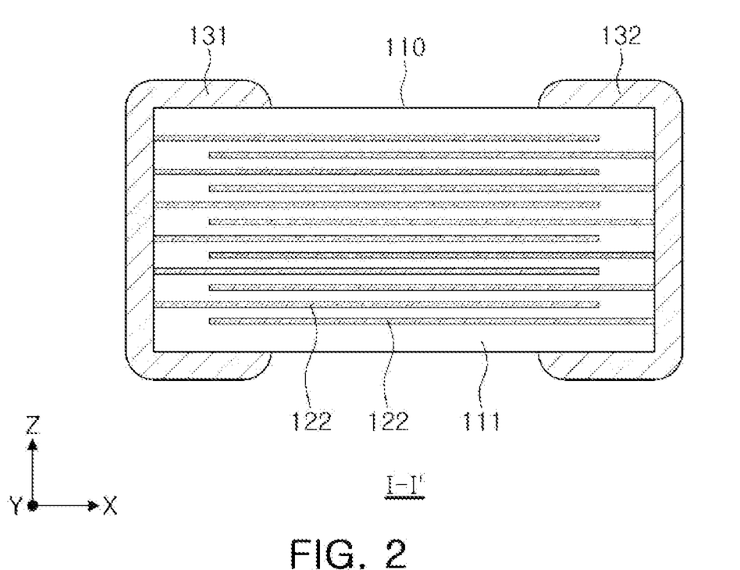
FIG. 2 is a cross-sectional view taken along line I-I' of FIG. 1.
Figure 3:
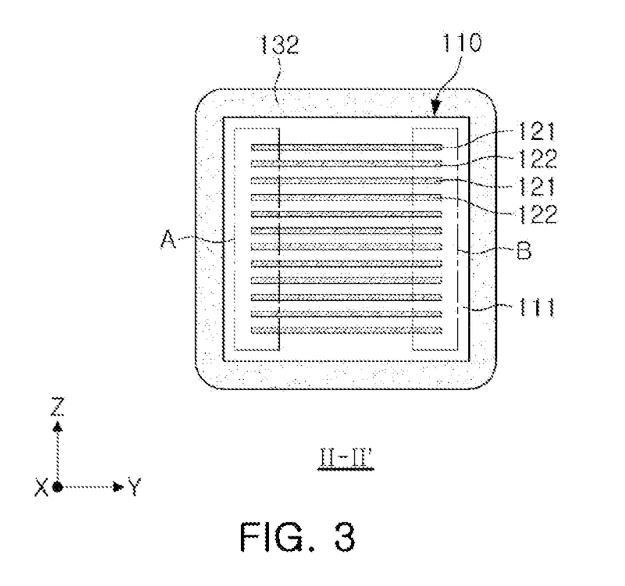
FIG. 3 is a cross-sectional view taken along line II-II' of FIG. 1.
Figure 4:
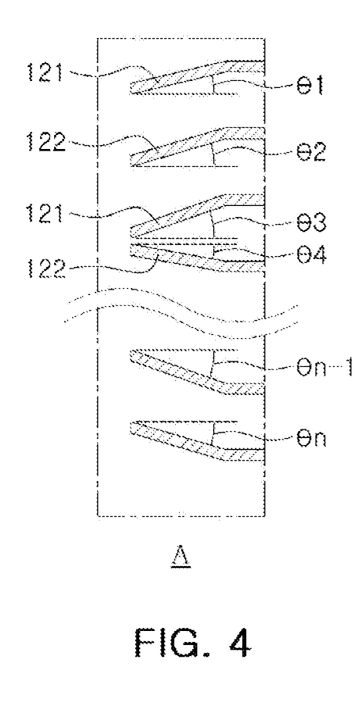
FIG. 4 is an enlarged view of region "A" of FIG. 3.
Figure 5:
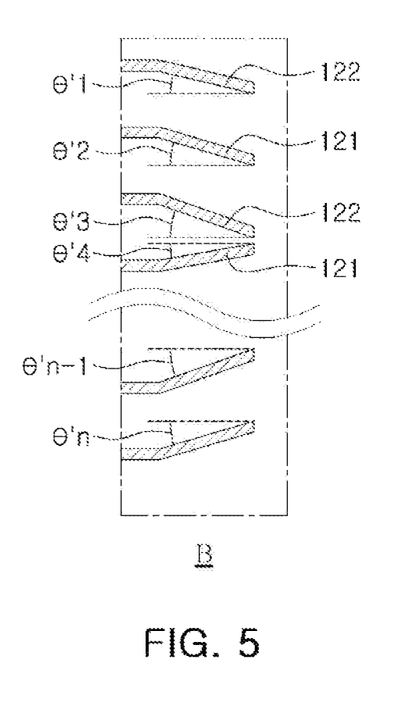
FIG. 5 is an enlarged view of region "B" of FIG. 3.

In an exemplary embodiment, when an absolute value of a horizontal angle in the second direction of the first internal electrode 121 with respect to the first surface S1 of the ceramic body 110 is referred to as a first angle of the first internal electrode 121, a total sum of the first angles may be less than 10°. The total sum of the first angles of the first internal electrode 121 may be a sum of all absolute values of horizontal angles measured with respect to a X-Y plane at a terminal end of the first internal electrode in the Y direction or that of horizontal angles measured with respect to the X-Y plane at a point where the first internal electrode and the margin portions meet. Based on FIGS. 4 and 5, the total sum of the horizontal angles ($\theta1, \theta3, \ldots, \theta n-1, \theta'2, \theta'4, \ldots, \theta'n$) with respect to the X-Y plane of the first internal electrode 121 may be represented as $\theta1+\theta3+\ldots +\theta n-1+\theta'2+\theta'4+\ldots+\theta'n$. The total sum of the first angles of the first internal electrode 121 may be less than 10°, 9° or less, 8° or less, 7° or less, 6° or less or 5° or less. Although not particularly limited, a lowest limit thereof may be, for example, at least 0°, 0° or higher, 0.2° or higher, 0.4° or higher, 0.6° or higher, 0.8° or higher or 1.0° or higher. By satisfying said range of the total sum of the first angles of the first internal electrode, better electrical field characteristics can be obtained.

In an example, a maximum value of the first angles of the first internal electrode 121 may be 1° or less. The maximum value of the first angle may refer to a highest value of the absolute values of the first angles of the first internal electrode. The maximum value of the first angle may be 1.0° or less, 0.9° or less, 0.8° or less, 0.7° or less, 0.6° or less or 0.5° or less. Although not particularly limited, a lowest limit thereof may be, for example, at least 0° or higher than 0°. By adjusting the maximum first angle of the first internal electrode 121 to be in said range, the first angle can satisfy the range described above.

In an exemplary embodiment, a total sum of the first angles of the first internal electrode 121 disposed in an outermost part of ceramic body in the third direction is 5° or less. The first internal electrode 121 disposed as the outermost portion of the ceramic body 110 in the third direction may refer to a first internal electrode 121 closest to the first surface S1 of the ceramic body and that closest to the second surface S2. A total sum of the first angles of the first internal electrode 121 disposed as the outermost portion of the ceramic body 110 in the third direction may be 5° or less, 4.5° or less, 4.0° or less, 3.5° or less, 3.0° or less, 2.5° or less or 2.0° or less. Although not particularly limited, a lowest limit thereof may be, for example, at least 0° or higher than 0°. When the total sum of the first angles of the first internal electrode 121 disposed as the outermost portion of the ceramic body 110 in the third direction satisfies said range, the first internal electrode can form uniform electrical field.

In another exemplary embodiment, when an absolute value of a horizontal angle in the second direction of the second internal electrode 122 with respect to the first surface S1 of the ceramic body 110 is referred to a second angle of the second internal electrode 122, a total sum of the first angles may be less than 10°. The total sum of the first angles of the second internal electrode 122 may be a sum of all absolute values of horizontal angles measured with respect to a X-Y plane at a terminal end of the second internal electrode in the Y direction or that of horizontal angles measured with respect to the X-Y plane at a point where the second internal electrode and the margin portions meet. Based on FIGS. 4 and 5, the total sum of the horizontal angles ($\theta2, \theta4, \ldots, \theta n, \theta'1, \theta'3, \ldots, \theta'n-1$) with respect to the X-Y plane of the second internal electrode 122 may be represented as $\theta2+\theta4+\ldots+\theta n+\theta'1+\theta'3+\ldots+\theta'n-1$. The total sum of the second angles of the second internal electrode 122 may be less than 10°, 9° or less, 8° or less, 7° or less, 6° or less or 5° or less. Although not particularly limited, but a lowest limit thereof may be, for example, at least 0°, 0° or higher, 0.2° or higher, 0.4° or higher, 0.6° or higher, 0.8° or higher or 1.0° or higher. By satisfying said range of the total sum of the second angles of the second internal electrode, better electrical field characteristics can be obtained.

In an example, a maximum value of the second angles of the second internal electrode 122 may be 1° or less. The maximum value of the second angle may refer to a highest value of the absolute values of the second angles of the second internal electrode. The maximum value of the second angle may be 1.0° or less, 0.9° or less, 0.8° or less, 0.7° or less, 0.6° or less or 0.5° or less. Although not particularly limited, a lowest limit thereof may be, for example, at least 0° or higher than 0°. By adjusting the maximum second angle of the second internal electrode 1221 to be in said range, the second angle can satisfy the range described above.

In an exemplary embodiment, a total sum of the second angles of the second internal electrode 122 disposed in an outermost part of ceramic body in the third direction is 5° or less. The second internal electrode 122 disposed as the outermost portion of the ceramic body 110 in the third direction may refer to a second internal electrode 122 closest to the first surface S1 of the ceramic body and that closest to the second surface S2. A total sum of the second angles of the second internal electrode 122 disposed as the outermost portion of the ceramic body 110 in the third direction may be 5° or less, 4.5° or less, 4.0° or less, 3.5° or less, 3.0° or less, 2.5° or less or 2.0° or less. Although not particularly limited, a lowest limit thereof may be, for example, at least 0° or higher than 0°. When the total sum of the second angles of the second internal electrode 122 disposed as the outermost portion of the ceramic body 110 in the third direction satisfies said range, the second internal electrode can form uniform electrical field.

In another exemplary embodiment, when an absolute value of a horizontal angle in the second direction of the first internal electrode 121 with respect to the first surface S1 of the ceramic body 110 is referred to as a first angle of the first internal electrode 121 and an absolute value of a horizontal angle in the second direction of the second internal electrode 122 with respect to the first surface S1 of the ceramic body 110 is referred to as a second angle of the second internal electrode 122, a total sum of the first angle and the second angle may be less than 10°. Based on FIGS. 4 and 5, the total sum of the first angle and the second angle with respect to the X-Y plane of the first internal electrode 121 and the second internal electrode 122 may be represented as $\theta1+\theta2+\ldots\theta+\theta n+\theta'1+\theta'2+\ldots+\theta'n$. The total sum of the first and second angles may be less than 10°, 9° or less, 8° or less, 7° or less, 6° or less or 5° or less. Although not particularly limited, but a lowest limit thereof may be, for example, at least 0°, 0° or higher, 0.2° or higher, 0.4° or higher, 0.6° or higher, 0.8° or higher or 1.0° or higher. By satisfying said range of the total sum of the first and second angles, better electrical field characteristics can be obtained.

In an exemplary embodiment, a sum of the first angle of the first internal electrode 121 and the second angle of the second internal electrode 122, which are disposed in an outermost part of ceramic body 110 in the third direction, may be 5° or less. The first internal electrode 121 disposed as the outermost portion of ceramic body 110 in the third direction may refer to a first internal electrode 121 closest to the first surface S1 of the ceramic body and that closest to the second surface S2, where the second internal electrode 122 disposed as the outermost portion of ceramic body 110 in the third direction may refer to a second internal electrode 122 closest to the first surface S1 of the ceramic body and that closest to the second surface S2. A sum of the first and second angles of the first and second internal electrode 121 and 122, respectively, disposed as the outermost portion of the ceramic body 110 in the third direction may be 5° or less, 4.5° or less, 4.0° or less, 3.5° or less, 3.0° or less, 2.5° or less or 2.0° or less. Although not particularly limited, a lowest limit thereof may be, for example, at least 0° or higher than 0°. When the total sum of the first angle of the first internal electrode 121 and the second angle of the second internal electrode 122, which are disposed as the outermost portion of the ceramic body 110 in the third direction, satisfies said range, the internal electrodes can form uniform electrical field.

A method for satisfying the first angle and/or the second angle of the first internal electrode and/or the second internal electrode is not particularly limited, but may include laminating a ceramic green sheet and a plurality of sheets to which an internal electrode pattern is applied followed by cutting the same using a razor cutter, or the like, or laminating dielectric layers and dry films on which the internal electrode pattern have already been cut into a desired size.

A material forming the first and second internal electrodes 121 and 122 is not particularly limited, and may be, for example, a conductive paste containing at least one of silver (Ag), palladium (Pd), gold (Au), platinum (Pt), nickel (Ni), copper (Cu), tin (Sn), tungsten (W), titanium (Ti) and alloys thereof. A method for printing the conductive paste may be a screen-printing method, a gravure printing method, or the like, but is not limited thereto.

An average thickness of the first and second internal electrodes 121 and 122 may be 0.4 μm or less. The average thickness of the internal electrodes may be an average of values measured at 5 different positions in the plasticized internal electrodes. A lowest limit of the average thickness of the first and second internal electrodes is not particularly limited, but may be at least 0.01 μm.

A multilayer ceramic capacitor according to an exemplary embodiment may include a first external electrode 131 connected to the first internal electrode 121 and a second external electrode 132 connected to the second internal electrode 122.

The first and second external electrodes 131 and 132 may be disposed to be in contact with the first and second internal electrodes 121 and 122, respectively. The first and second external electrodes 131 and 132 disposed to be in contact with the first and second internal electrodes 121 and 122 may mean that the first external electrode is electrically in contact with the first internal electrode through a portion thereof exposed outside of the body and the second external electrode is electrically in contact with the second internal electrode through a portion thereof exposed outside of the body. The first and second external electrodes 131 and 132 may extend to four surfaces in contact with exposed surfaces of the first and second internal electrodes.

A method for forming the first and second external electrodes 131 and 132 is not necessarily limited, and for example, may involve dipping the body in a paste containing a conductive metal and glass or transferring a dry film obtained by drying the metal paste on the fifth surface and the sixth surface of the ceramic body.

In an exemplary embodiment, the first and second external electrodes 131 and 132 may use at least one of silver (Ag), palladium (Pd), gold (Au), platinum (Pt), nickel (Ni), copper (Cu), tin (Sn), tungsten (W), titanium (Ti) and alloys thereof. Further, in order to improve mountability thereof on the substrate, a plated layer may be formed on the first and second external electrodes 131 and 132.

Figure 6:
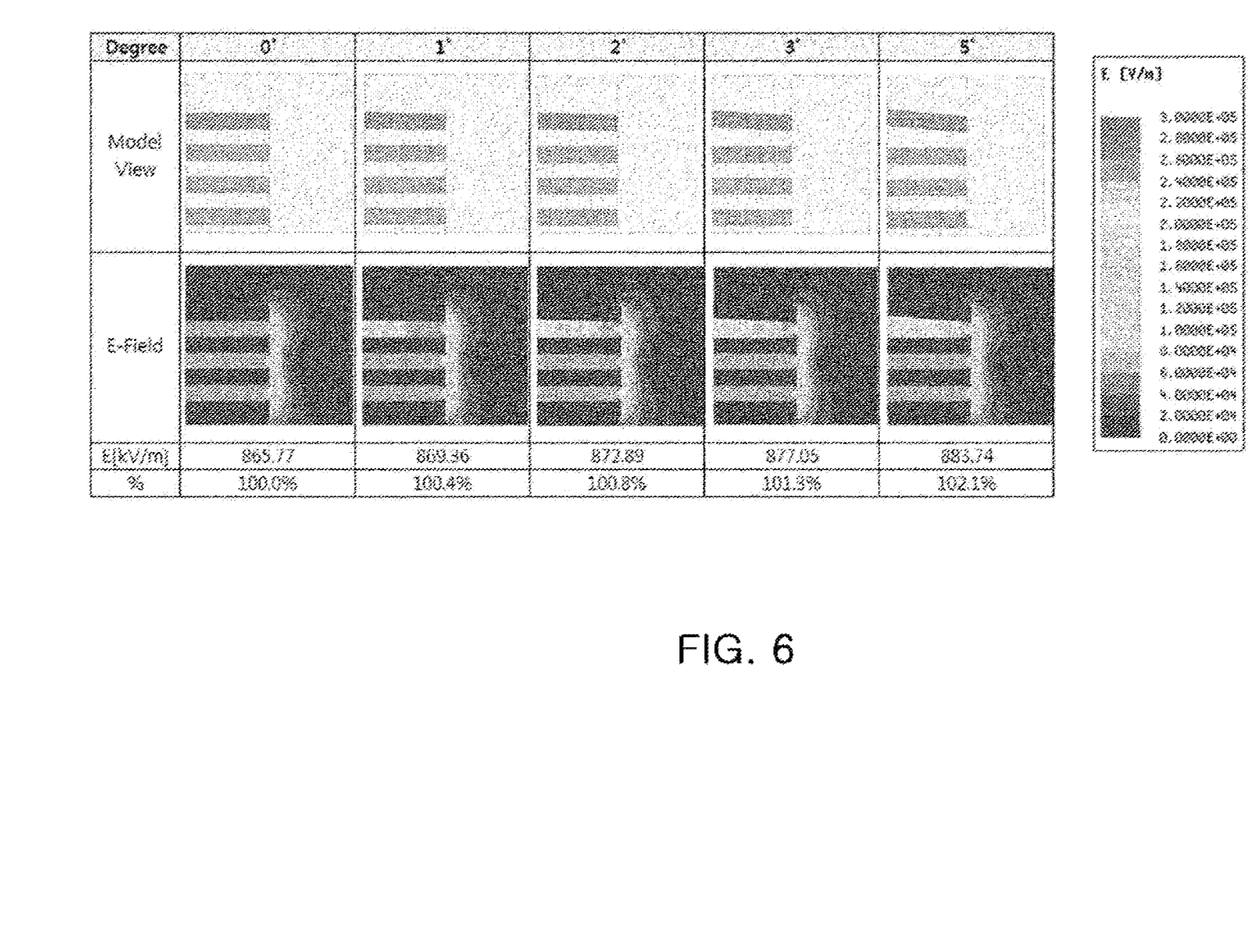
FIG. 6 is an image illustrating changes in electrical fields according to angle changes of internal electrodes.

FIG. 6 is a diagram illustrating an effect of an internal electrode angle of the internal electrode of the multilayer ceramic capacitor on the electrical field.

As illustrated in FIG. 6, strength of the electrical field applied to the internal electrodes increases as the internal electrode angle increases. For example, if the electric field at an internal electrode angle of 0° is considered 100%, changing the angle to 1° increases the electric field at the edges of the internal electrodes to 100.4%, and changing the internal electrode angle to 5° increases the electric field at the edges of the internal electrodes to 102.1%. In particular, when the internal electrode angle changes by 5°, the strength of the electrical field increases by at least 2%. In other words, when the first and second internal electrodes are arranged in accordance with the embodiments of the present disclosure, i.e., when the sum of first angles and/or the second angles is less than or equal to 10°, the electric field strength across the internal electrodes is no more than 120% of the electric field strength across the internal electrodes if all of the first angles and the second angles were zero, i.e., all of the internal electrodes perfectly parallel to the first surface S1.

Therefore, the multilayer ceramic capacitor according to the present disclosure can maintain an effect of the electrical field applied to the internal electrodes by adjusting the angle of the internal electrodes to be in a predetermined range. Further, BDV can be improved by adjusting the electrical field of each internal electrode to be in a certain range.

According to an exemplary embodiment of the present disclosure, a multilayer ceramic capacitor having excellent electrical field characteristics is provided.

According to another embodiment of the present disclosure, a multilayer ceramic capacitor in which deformation of the internal electrodes is suppressed is provided.

While embodiments have been shown and described above, it will be apparent to those skilled in the art that modifications and variations could be made without departing from the scope of the present disclosure as defined by the appended claims.

What is claimed is:

1. A multilayer ceramic capacitor, comprising:
a ceramic body comprising dielectric layers and first and second internal electrodes laminated in a third direction with respective dielectric layers interposed therebetween, and first and second surfaces opposing each other in a direction in which the first and second internal electrodes are laminated, third and fourth surfaces connected to the first and second surfaces and opposing each other in a first direction, and fifth and sixth surfaces connected to the first and second surfaces and the third and fourth surfaces and opposing each other in a second direction; and
first and second external electrodes disposed on both surfaces of the ceramic body in the first direction, the first and second external electrodes being connected to the first and second internal electrodes,
wherein, when an absolute value of a horizontal angle in the second direction of the first internal electrode with respect to the first surface of the ceramic body is referred to as a first angle of the internal electrode, a sum of the absolute values of the first angles of outermost internal electrodes, disposed in an outermost part of the ceramic body in the third direction, among the first internal electrodes is 5° or less.

2. The multilayer ceramic capacitor of claim 1, wherein the total sum of the first angles exceeds 0°.

3. The multilayer ceramic capacitor of claim 1, wherein a maximum value of the first angles is 3° or less.

4. The multilayer ceramic capacitor of claim 1, wherein a maximum value of the first angles is 1° or less.

5. The multilayer ceramic capacitor of claim 1, wherein the first and second internal electrodes have a thickness in a range from 0.01 μm to 0.4 μm.

6. The multilayer ceramic capacitor of claim 1, wherein ends of outermost internal electrodes, respectively disposed in an uppermost part and a lowermost part of the ceramic body in the third direction, among the second internal electrodes, are bent towards a center portion of the ceramic body in the third direction.

7. A multilayer ceramic capacitor, comprising:
a ceramic body comprising dielectric layers and first and second internal electrodes laminated in a third direction with respective dielectric layers interposed therebetween, and first and second surfaces opposing each other in a direction in which the first and second internal electrodes are laminated, third and fourth surfaces connected to the first and second surfaces and opposing each other in a first direction, and fifth and sixth surfaces connected to the first and second surfaces and the third and fourth surfaces and opposing each other in a second direction; and
first and second external electrodes disposed on both surfaces of the ceramic body in the first direction, the first and second external electrodes being connected to the first and second internal electrodes,
wherein, when an absolute value of a horizontal angle in the second direction of the second internal electrode with respect to the first surface of the ceramic body is referred to a second angle of the internal electrode, a sum of the absolute values of the second angles of outermost internal electrodes, disposed in an outermost part of the ceramic body in the third direction, among the second internal electrodes is 5° or less.

8. The multilayer ceramic capacitor of claim 7, wherein the total sum of the second angles exceeds 0°.

9. The multilayer ceramic capacitor of claim 7, wherein a maximum value of the second angles is 3° or less.

10. The multilayer ceramic capacitor of claim 7, wherein a maximum value of the second angles is 1° or less.

11. The multilayer ceramic capacitor of claim 7, wherein the first and second internal electrodes have a thickness in a range from 0.01 μm to 0.4 μm.

12. The multilayer ceramic capacitor of claim 7, wherein ends of outermost internal electrodes, respectively disposed in an uppermost part and a lowermost part of the ceramic body in the third direction, among the second internal electrodes, are bent towards a center portion of the ceramic body in the third direction.

* * * * *